March 26, 1968     S. H. FORD     3,374,658
HIGH PRESSURE GAS FROST-POINT INDICATOR
Filed Jan. 28, 1965
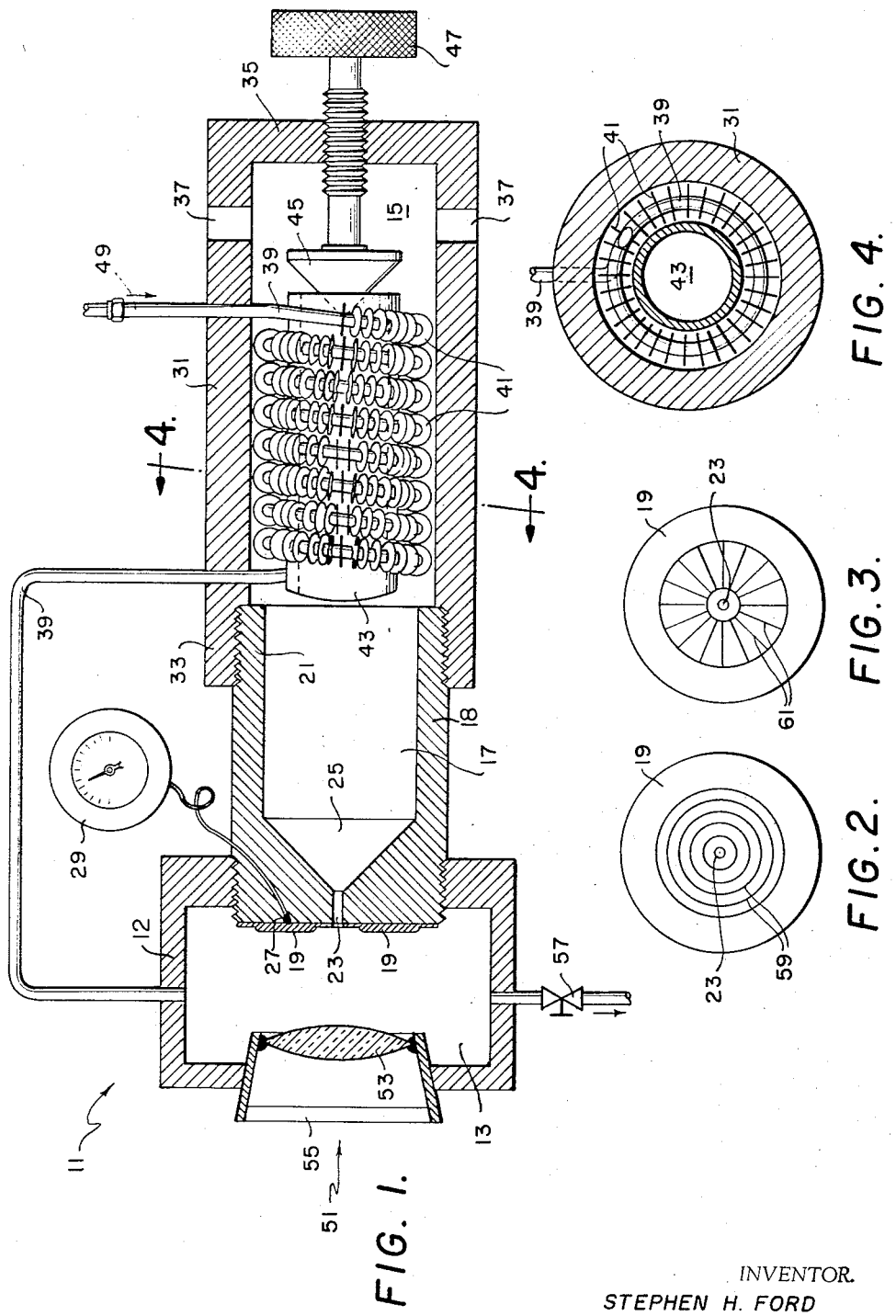
INVENTOR.
STEPHEN H. FORD

UNITED STATES PATENT OFFICE 3,374,658
Patented Mar. 26, 1968

3,374,658
HIGH PRESSURE GAS FROST-POINT INDICATOR
Stephen H. Ford, 211 Hanover St.,
Annapolis, Md. 21401
Filed Jan. 28, 1965, Ser. No. 428,881
7 Claims. (Cl. 73—17)

ABSTRACT OF THE DISCLOSURE

An instrument for indicating the moisture content of pressurized gases. Inside the indicator gas flows across a polished mirror-like metal plate and through a small orifice in the center of the metal plate. In passing through the orifice to atmospheric pressure, the rapidly expanding air cools the metal plate until the plate is cooled to the frost-point temperature of the gas. The condensate and the temperature of the plate are then observed by the operator to determine the moisture content of the pressurized gas. The expanded gas is passed over a heat exchanger, through which the gas is introduced into the system to precool the pressurized gas before it flows across the mirror.

---

The invention described herein may be manufactured and used by or for the Government of the United States of America for governmental purposes without the payment of any royalties thereon or therefor.

The present invention relates to instruments for indicating the moisture content of gases and, more particularly, to instruments for directly measuring the frost-point of a high pressure gas system.

In the field of gas moisture indicators, there has been the general practice to employ an additional source of energy in addition to the compressed gas being sampled, in order to reach the necessary temperatures for determining moisture content. Although such devices have served the purpose, they have not proved entirely satisfactory under all conditions of service due to the added expense of an external coolant, and where weight and space is a consideration, e.g. aboard ships, the storage and use of the coolant becomes a critical factor. Also, in the prior art devices, the adjustment of the rate of flow of the gas sample and of the rate of cooling of the moisture deposit plate is usually approximated by the operator of the device. This causes error.

The general purpose of this invention is to provide a gas frost-point indicator which embraces all the advantages of similarly employed gas moisture indicators and possesses none of the aforedescribed disadvantages. To attain this, the present invention contemplates a unique indicator incorporating a small orifice in the center of the moisture deposit plate for controlling the rate of cooling and sample flow rate, and a heat exchanger portion whereby the indicator is self cooling.

Accordingly, it is an object of this invention to provide a lightweight, inexpensive, easy to read, self contained instrument that will directly measure the frost-point of a high-pressure gas system at system pressure.

A further object is to provide an instrument having a constant sampling rate for each pressure of a compressed gas system.

Still another object of this invention is the provision of a constant cooling rate for each pressure of a gas system.

A still further object is to provide a self cooling instrument wherein an external source of power or refrigeration is not needed.

Another object is to provide pre-chilling of the gas sample and to provide more visible precipitation.

Other objects and many of the attendant advantages of this invention will be readily appreciated as the same becomes better understood by reference to the following detailed description when considered in connection with the accompanying drawings wherein:

FIG. 1 is a partly diagrammatic view in longitudinal cross-section of an embodiment of a gas frost-point indicator made in accordance with the principles of the present invention;

FIG. 2 is an end view of an embodiment of the moisture deposit plate of the present invention;

FIG. 3 is an end view of a further embodiment of the moisture deposit plate; and FIG. 4 is a transverse cross-sectional view of the heat exchanger portion of the present indicator.

Referring now to the drawings, wherein like reference numerals designate like or corresponding parts throughout the several views, there is shown in FIG. 1 a gas frost-point indicator 11 having a measuring housing 12, an expansion housing 18 and a heat exchanger housing 31. The housing 12 comprises a measuring chamber 13, the housing 18 comprises an expansion chamber 17 and the housing 31 comprises a heat exchanger chamber 15.

The expansion housing has at one end portion a moisture deposit plate 19 having a mirror-like polished surface as shown in FIGS. 2 and 3 located within measuring chamber 13, and a threaded open end portion 21 extending into the heat exchanger chamber 15. A deposit plate 19 has an orifice 23 at its center extending through the conical shaped interior portion 25 of the expansion chamber for communication between the measuring chamber 13 and the expansion chamber 17. The expansion chamber portion of the indicator is shown threaded at both ends for easy removal from the instrument. This allows expansion chambers having predetermined orifice diameter to be selectively used or an expansion chamber having a variable orifice diameter to be used. Since the orifice diameter of the expansion chamber is related to the pressure of the sampled gas, a predetermined sampling rate and cooling rate may be effected by changing the orifice diameter. A thermocouple 27 is located near the back surface of the deposit plate 19 and is connected to a temperature gauge 29 extending outside the instrument.

The heat exchanger chamber 15 comprises a tubular housing 31 having a threaded open end portion 33 into which the expansion chamber 17 is mated and a closed end portion 35. A plurality of vents 37 for exhausting the sampled gas to the atmosphere are circumferentially spaced about the housing 31 and proximate to end portion 35. As shown in FIG. 4, tubing 39 having heat exchanger fins 41 is coiled about an open ended cylinder 43 which is located within housing 31 and has one open end proximate to the expansion chamber 17. A valve member 45, which may be adjusted by means of a thumbscrew 47 or the like, is adjustably mounted in the closed end portion 35 of chamber 15, is provided for restricting the size of the opening of the cylinder 43. The tubing 39 which may be stainless steel, or the like, has one end 49 extending through the housing 31 for coupling the sampled gas to the instrument and has its other end extending through the housing 31 and into the measuring chamber 13 for delivering the prechilled gas sample to the measuring chamber.

Measuring chamber 13 has the deposit plate 19 located at one end and a glass arrangement 51 located directly in line with the plate 19 at its other end. The sight glass arrangement includes a pressure sealing lens 53 and a glass 55 having a desiccated gas therebetween for non-fogging purposes. A purge valve 57 is located in the chamber 13 for venting the sample air in preparation for another measurement. The purge valve may also be used to defrost the mirror-like surface of plate 19 quickly so that a repeat measurement may be made, to remove condensate from the instrument, and to aid in drying out the measurement chamber, or to control the temperature of the deposit plate if series of successive moisture measurements is desired.

In operation as a frost-point indicator, the gas to be sampled is connected to the instrument by means of a coupling on tubing 49. The gas under pressure flows through the tubing in the heat exchanger chamber 15 and is cooled as will be explained hereafter. From the heat exchanger, the precooled gas is passed into the measuring chamber 13 having the mirror-like polished surface where precipitation occurs at one end which can be observed through the sight glass arrangement 51. Gas under pressure flows across the polished metal surface toward the orifice 23, precipitating frost crystals on the polished surface in a doughnut shaped pattern readily observed through the sight glass arrangement. In passing through the orifice, the gas is sampled at a constant rate since only a predetermined amount of gas under a specified pressure can pass through the orifice in a predetermined time, this factor also provides a constant cooling rate for the instrument. The instrument provides a great degree of precipitation in that the sampled gas is drawn across the mirror surface to the orifice due to the configuration of the measuring chamber and the tendency of the gas to go from a high pressure area to a low pressure area.

The gas in going from the high pressure area in measuring chamber 13 to the low pressure area in expansion chamber 17, expands and is cooled as is well known in the art and in the expansion process provides a turbulent flow pattern. The highly turbulent cold gas from the orifice removes sufficient heat from the conical shaped heat transfer surface 25 behind the deposit plate 19 to cause a lowering of the deposit plate's surface temperature, thereby causing precipitation upon the surface of plate 19.

The cold low pressure gas from the orifice, after having absorbed some heat from the conical shaped surface, passes into the heat exchanger chamber 15. In this portion of the instrument, the gas takes the path of least resistance which ordinarily will be a flow through the cylinder 39, with some of the flow passing on the outside surface of the cylinder and coming in contact with the heat exchanger tubes 41 and fins 43 thereby causing a cooling of the incoming sampled gas. The path of least resistance may be varied by means of the valve member 45. The position of this valve is changed by a thumb-screw 47, thereby causing the valve member 45 to vary the size of the opening of cylinder 39. The size of the opening of cylinder 39 is inversely proportional to quantity of gas flowing around the tubes 41 and fins 43. That is, the valve member 45 restricts the flow of gas through cylinder 39 to thereby cause the gas to flow around the tubes 41 and fins 43. The gas is then exhausted to the atmosphere through apertures 37.

FIGS. 2 and 3 show alternate embodiments of the deposit plate 19 having the polished mirror-like precipitation surface. FIG. 2 which is the preferred embodiment shows a plurality of circumferential lines 59 radially spaced from the orifice 23 in the deposit plate 19. These etched areas or lines are not visible until precipitation occurs and aid the observer in detecting precipitation on the surface. FIG. 3 which is an alternate embodiment of the deposit plate 19 shows a plurality of radial lines 61 extending from the orifice 23 in the plate 19. The lines in this embodiment function in the same manner as the lines in the preferred embodiment that is, the lines are not visibly detectable until a condensate has precipitated on plate 19.

Obviously many modifications variation of the present invention are possible in the light of the above teachings. It is therefore to be understood that within the scope of the appended claims the invention may be practiced otherwise than as specifically described.

What is claimed is:

1. An instrument for indicating the moisture content of pressurized gas, comprising:
   a first housing having a measuring chamber within said first housing;
   said first housing having an escape orifice operatively connecting said measuring chamber to the exterior of said first housing;
   a first means within said measuring chamber, adjacent said escape orifice, for receiving a condensate from the pressurized gas, whereby the pressurized gas when escaping through said escape orifice will expand and cool said first means;
   viewing means, in said first housing, enabling observation of the condensate;
   indicating means, connected to said first means, for indicating the temperature of said first means whereby formation of condensate and the temperature of said first means enables the determination of the moisture content of the pressurized gas.

2. An instrument for indicating the moisture content of pressurized gas, as described in claim 1, further comprising:
   supply means, connected to said first housing, for supplying the pressurized gas to said measuring chamber.

3. An instrument for indicating the moisture content of pressurized gas, as described in claim 2, further comprising:
   a second housing, having an expansion chamber within said second housing, connected to said first housing;
   said escape orifice operatively connected between said measuring chamber and said expansion chamber whereby the pressurized gas will escape from said measuring chamber to said expansion chamber and expand while within said expansion chamber; and
   a third housing, having a heat exchanger chamber within said third housing, connected to said second housing;
   said heat exchanger chamber operatively connected to said expansion chamber whereby the expanded gas will move from said expansion chamber to said heat exchanger chamber; and
   said supply means extending within said heat exchanger chamber whereby the pressurized gas within said supply means will be cooled by the expanded gas within said heat exchanger chamber.

4. An instrument for indicating the moisture content of pressurized gases, as described in claim 3, further comprising:
   a tubular cylinder within said heat exchanger chamber;
   said supply means comprising a fluid conduit wound about said cylinder; and
   control means, connected to said third housing, for controlling the quantity of expanded gas flowing through said tubular cylinder.

5. An instrument for indicating the moisture content of pressurized gas, as described in claim 4, wherein said third housing further comprises at least one exhaust aperture to enable the expanded gas to exhaust from said heat exchanger chamber.

6. An instrument for indicating the moisture content of pressurized gas, as described in claim 5, wherein said first means further comprises a plate having a mirror-like polished surface.

7. An instrument for indicating the moisture content of pressurized gas, as described in claim 6, wherein said plate includes at least one line described on its surface to assist the observation of the condensate on said plate.

References Cited

UNITED STATES PATENTS

| | | | |
|---|---|---|---|
| 2,697,933 | 12/1958 | Donath | 73—17 |
| 2,904,995 | 2/1959 | Obermaier | 73—17 |
| 3,152,475 | 10/1964 | Ford et al. | 73—335 |

JAMES J. GILL, *Primary Examiner.*

EDDIE SCOTT, *Assistant Examiner.*